United States Patent
Jono

(10) Patent No.: US 9,389,380 B2
(45) Date of Patent: Jul. 12, 2016

(54) OPTICAL FIBER ASSEMBLY, OPTICAL PROBE, AND METHOD FOR MANUFACTURING OPTICAL FIBER ASSEMBLY

(75) Inventor: Junichi Jono, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 105 days.

(21) Appl. No.: 14/122,890

(22) PCT Filed: May 11, 2012

(86) PCT No.: PCT/JP2012/003112
§ 371 (c)(1),
(2), (4) Date: Nov. 27, 2013

(87) PCT Pub. No.: WO2012/164838
PCT Pub. Date: Dec. 6, 2012

(65) Prior Publication Data
US 2014/0093209 A1    Apr. 3, 2014

(30) Foreign Application Priority Data
May 31, 2011    (JP) .................................. 2011-121644

(51) Int. Cl.
G02B 6/06    (2006.01)
G02B 6/00    (2006.01)
G02B 6/42    (2006.01)
G02B 6/38    (2006.01)
(Continued)

(52) U.S. Cl.
CPC ............ *G02B 6/44* (2013.01); *B29D 11/00721* (2013.01); *G02B 6/04* (2013.01); *G02B 6/4234* (2013.01); *G02B 6/08* (2013.01)

(58) Field of Classification Search
CPC .......... G02B 6/04; G02B 6/08; G02B 6/4234; G02B 6/44; G02B 23/2415; B29D 11/00721

USPC ........ 385/52, 70, 80, 115–117, 120, 137–139
See application file for complete search history.

(56) References Cited

U.S. PATENT DOCUMENTS 5,073,048 A    12/1991   Adachi et al.
5,694,509 A *  12/1997   Uemura ............... G02B 6/2835
                                                                  385/43
(Continued)

FOREIGN PATENT DOCUMENTS

JP    64-013008    1/1989
JP    01-115704    8/1989
(Continued)

OTHER PUBLICATIONS

Office Action dated Sep. 29, 2015 which issued in the corresponding Japanese Patent Application No. 2013-517839.

*Primary Examiner* — Kaveh C Kianni
*Assistant Examiner* — Hung Lam
(74) *Attorney, Agent, or Firm* — Cozen O'Connor

(57) ABSTRACT

Provided is an optical fiber assembly with which flexibility in the vicinity of an alignment member can be maintained, as well as a method for manufacturing this optical fiber assembly, and an optical probe which uses this optical fiber assembly. This optical fiber assembly is equipped with: multiple optical fibers (11, 12); an alignment member (10) that aligns and holds these multiple optical fibers (11, 12); a first adhesion part (20) where the alignment member (10) and the multiple optical fibers (11, 12) are adhered by means of a first adhesive agent having curability; and a second adhesion part (21) where the multiple optical fibers (11, 12) are adhered to each other within a prescribed distance from the rear end of the alignment member (10) by means of a second adhesive agent that cures while having greater flexibility than the first adhesive agent.

6 Claims, 5 Drawing Sheets

(51) Int. Cl.
*G02B 6/36* (2006.01)
*G02B 6/44* (2006.01)
*G02B 6/04* (2006.01)
*B29D 11/00* (2006.01)
*G02B 6/08* (2006.01)

(56) References Cited

U.S. PATENT DOCUMENTS

2005/0192480 A1  9/2005  Toriya et al.
2006/0045444 A1* 3/2006  Miller et al. ................ 385/115
2007/0127020 A1  6/2007  Hikichi et al.
2010/0114115 A1* 5/2010  Schlesinger et al. .......... 606/130
2012/0069348 A1* 3/2012  Jono et al. .................... 356/479

FOREIGN PATENT DOCUMENTS

| JP | 2002-034896 | 2/2002 |
| JP | 2005-134824 | 5/2005 |
| JP | 2005-237436 | 9/2005 |
| JP | 2006-023639 | 1/2006 |
| JP | 2007-132792 | 5/2007 |

* cited by examiner

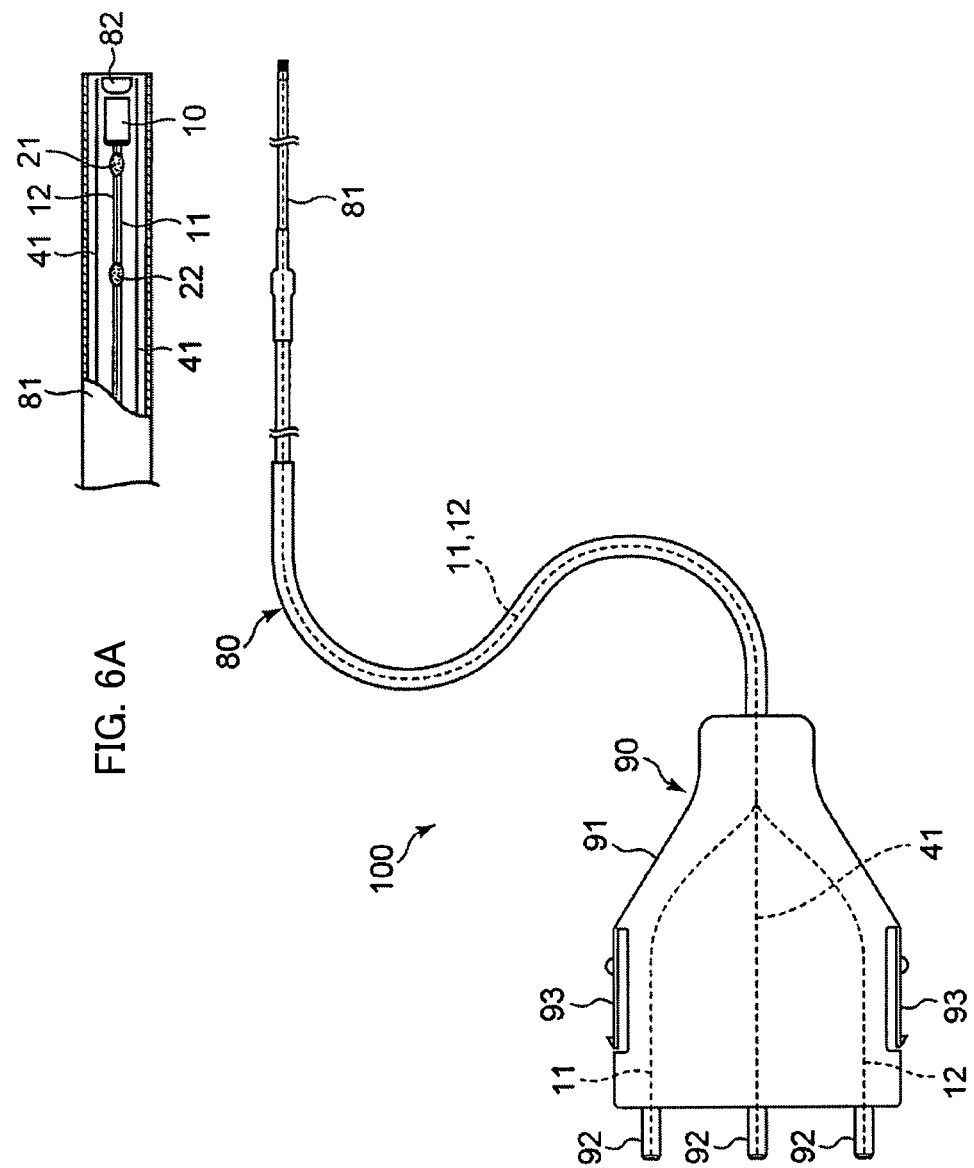

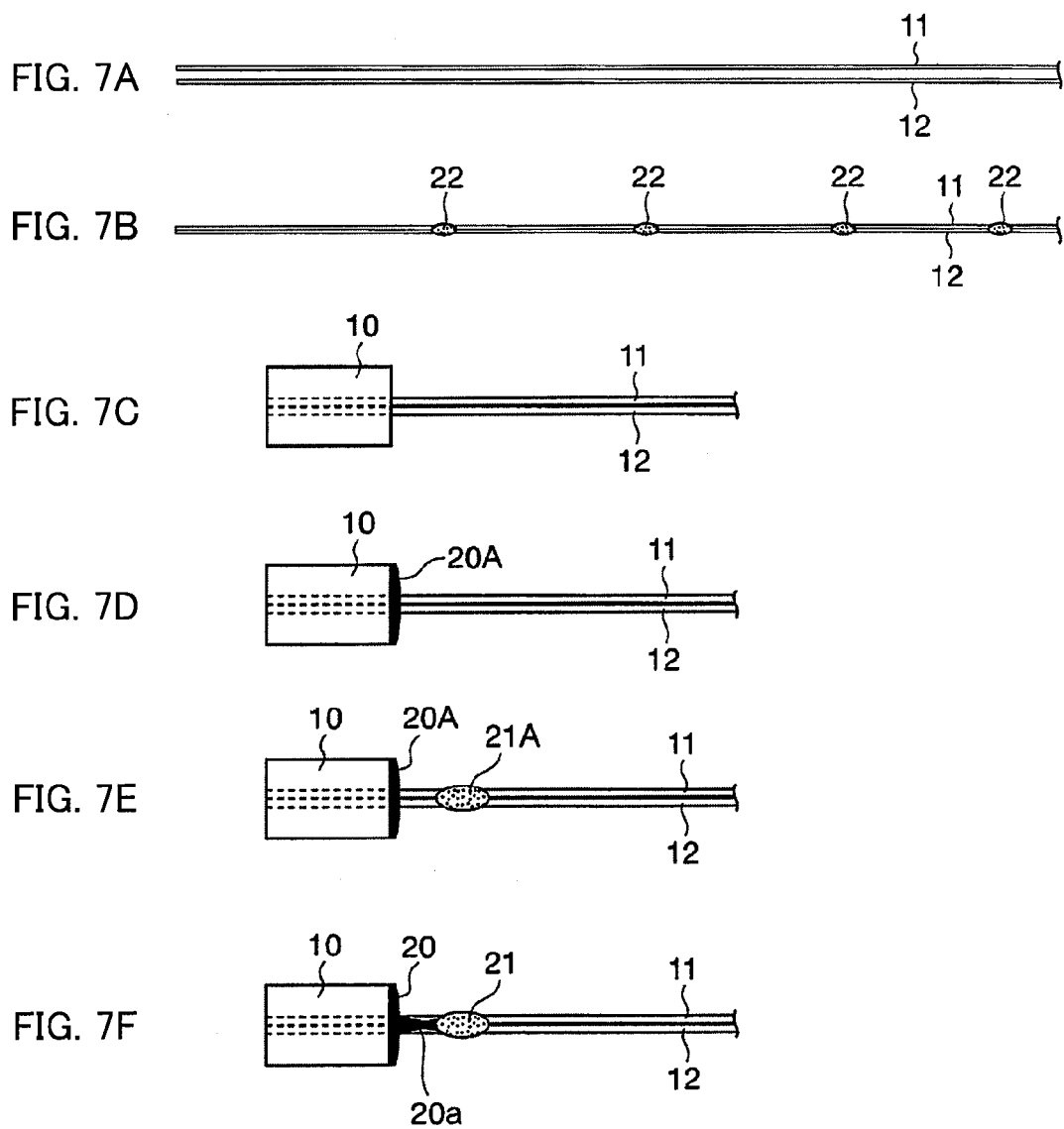

OPTICAL FIBER ASSEMBLY, OPTICAL PROBE, AND METHOD FOR MANUFACTURING OPTICAL FIBER ASSEMBLY

RELATED APPLICATIONS

This application is a U.S. National Phase Application under 35 USC 371 of International Application PCT/JP2012/003112 filed May 11, 2012.

This application claims the priority of Japanese application No. 2011-121644 filed May 31, 2011, the entire content of which is hereby incorporated by reference.

TECHNICAL FIELD

The present invention relates to an optical fiber assembly composed of a plurality of assembled optical fibers, an optical probe including therein the optical fiber assembly, and a method for manufacturing the optical fiber assembly.

BACKGROUND ART

Conventionally, there have been optical analyzers that analyze inspection targets (e.g., lumens in the living body) by irradiating the target with light such as excitation light and by measuring light emitted from the target such as fluorescence, generated by the light irradiation. Such optical analyzers generally use an optical probe which transmits light between the analyzer and target.

A plurality of optical fibers for respectively transmitting irradiation light and received light are inserted through such an optical probe, with the respective distal ends of the plurality of optical fibers being aligned and fixed on the distal side of the optical probe (e.g., see PTL 1).

CITATION LIST

Patent Literature

PTL 1
Japanese Patent Application Laid-Open No. 2007-132792

SUMMARY OF INVENTION

Technical Problem

Optical probes are often curved or bent during use, e.g., curved along lumens in the living body, or bent according to the movement of an endoscope when the inserted into a channel of the endoscope inserted into lumens in the living body. For this reason, a plurality of optical fibers incorporated in the optical probe is required to have a predetermined level of flexibility. In a manufacturing process of an optical probe, a plurality of optical fibers is generally aligned close to each other using an alignment member and fixed using an adhesive agent. However, when the adhesive agent has high fluidity, and if the plurality of optical fibers is located close to each other, the adhesive agent may spread in a longitudinal direction of the optical fibers due to capillary action and then remain solidified over a long distance. Since the flexibility of the optical fibers is reduced at a portion where the adhesive agent is solidified, the optical fibers may be damaged when they are bent at that portion.

An object of the present invention is therefore to provide an optical fiber assembly capable of maintaining flexibility in the vicinity of an alignment member, a manufacturing method thereof, and an optical probe including the optical fiber assembly.

Solution to Problem

One aspect of an optical fiber assembly according to the present invention includes a plurality of optical fibers, an alignment member that aligns and holds the plurality of optical fibers, a first adhesion part where the alignment member and the plurality of optical fibers are bonded by a first adhesive agent having curability, and a second adhesion part where the plurality of optical fibers are bonded to each other at a position within a predetermined distance from the rear end of the alignment member by a second adhesive agent that has, after cured, greater flexibility than the first adhesive agent.

One aspect of a method for manufacturing an optical fiber assembly according to the present invention is a method for manufacturing an optical fiber assembly using a plurality of optical fibers, an alignment member, a first adhesive agent having curability and a second adhesive agent that has, after cured, greater flexibility than the first adhesive agent, the method including: causing the alignment member to hold and align distal ends of the plurality of optical fibers, applying the first adhesive agent to a contact region between the plurality of optical fibers and the alignment member before, after or during the alignment member holds and aligns the distal ends of the plurality of optical fibers, curing the applied first adhesive agent, and bonding the plurality of optical fibers to each other within a predetermined distance from a rear end of the alignment member by the second adhesive agent, wherein the curing is performed after the bonding.

Advantageous Effects of Invention

According to the optical fiber assembly according to the present invention, the second adhesion part prevents the first adhesive agent that bonds the optical fibers and the alignment member from spreading and solidifying over an extended range in the longitudinal direction of the optical fibers. Therefore, it is possible to maintain the flexibility in the vicinity of the alignment member in the optical fiber assembly.

According to the method for manufacturing an optical fiber assembly according to the present invention, the second adhesion part prevents the first adhesive agent for bonding the optical fibers and the alignment member from spreading and solidifying over a long distance in the longitudinal direction of the optical fibers, and making it possible to manufacture an optical fiber assembly, the flexibility of which is maintained in the vicinity of the alignment member.

BRIEF DESCRIPTION OF DRAWINGS

FIG. 1A shows a side view thereof; and FIG. 1B shows an enlarged view of an adhesion part thereof;

FIG. 3A shows a perspective view thereof, and FIG. 3B shows a front view thereof;

FIGS. 6A and 6B illustrate an optical probe incorporating therein the optical fiber assembly; FIG. 6A shows a partially exploded side view of the distal end thereof and FIG. 6B shows an overall plan view; and FIGS. 7A to 7F illustrate a flow of a manufacturing process of an optical fiber assembly.

DESCRIPTION OF EMBODIMENTS

Hereinafter, an embodiment of the present invention will be described with reference to the accompanying drawings.

Figure 1:
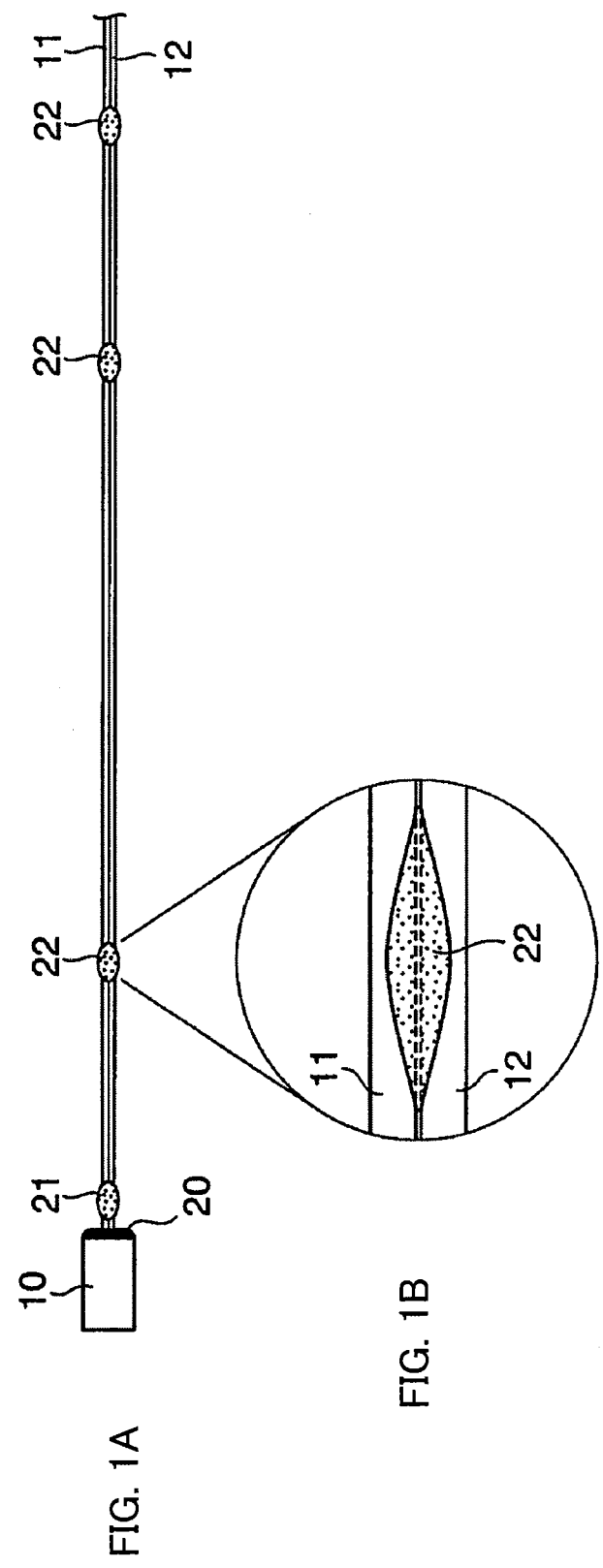
FIGS. 1A and 1B illustrate an optical fiber assembly according to an embodiment of the present invention.
Figure 2:
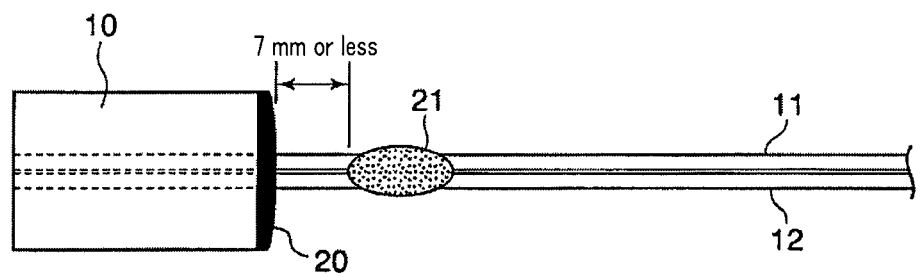
FIG. 2 shows a side view of a distal end of the optical fiber assembly.
Figures 3A, 3B:
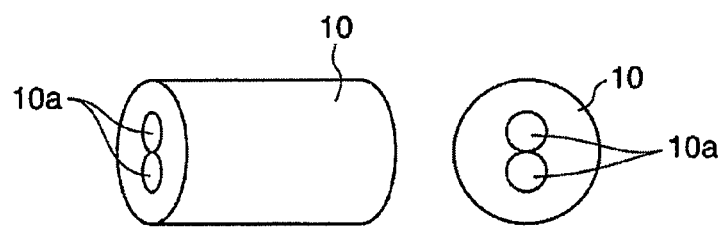
FIGS. 3A and 3B illustrate an alignment member.

FIGS. 1A and 1B illustrate an optical fiber assembly according to an embodiment of the present invention, wherein FIG. 1A shows a side view thereof and FIG. 1B shows an enlarged view of an adhesion part thereof. FIG. 2 shows a side view of a distal end of the optical fiber assembly. FIGS. 3A and 3B illustrate alignment member 10, wherein FIG. 3A shows a perspective view thereof and FIG. 3B shows a front view thereof.

As shown in FIGS. 1A and 1B, the optical fiber assembly of the present embodiment is provided with two optical fibers 11 and 12, and alignment member 10 that aligns two optical fibers 11 and 12 with their distal ends located in proximity to each other. Moreover, the optical fiber assembly is provided with alignment adhesion part (first adhesion part) 20 that bonds optical fibers 11 and 12, and alignment member 10, second adhesion part 21 closest to alignment member 10 where optical fibers 11 and 12 are bonded to each other at a position within a predetermined distance from the rear end of alignment member 10, and a plurality of fiber adhesion parts (fiber trunk side-adhesion parts) 22 where optical fibers 11 and 12 are bonded to each other at a plurality of spaced apart locations.

Optical fibers 11 and 12 are cable conductors composed of a bare conductor composed of a core and a clad coated with polyimide as a primary coat. These optical fibers 11 and 12 are not provided with a thick fiber coat, and have quite a small diameter of, for example, 0.05 to 0.5 mm. Therefore, if the plurality of optical fibers remains apart from each other, they may intertwine with each other and become tangled, making them very difficult to handle.

As shown in FIGS. 3A and 3B, alignment member 10 is a micro-capillary member with two through holes 10a provided at the center of a columnar block. The inner diameter of each through hole 10a is set to a diameter equal to the outer diameter of optical fiber 11 or 12 plus a very small clearance. Thus, when two optical fibers 11 and 12 are inserted in the through holes, they are held such that the optical axes thereof are adjusted to predetermined positions. Alignment member 10 can be made of zirconia or quartz glass. Alignment member 10 may also be made of metal as long as it can be subjected to precision machining and it has predetermined strength. For alignment member 10, a V-groove alignment member may be adopted in addition to the micro-capillary type. The shape and scale thereof can be changed in various ways.

As shown in FIG. 2, two optical fibers 11 and 12 and alignment member 10 are bonded together at the rear end surface of alignment member 10 and the inner surfaces of through holes 10a with a first adhesive agent. A cured first adhesive agent is alignment adhesion part 20 in FIG. 2. The tip surface of alignment member 10 is polished after curing of the first adhesive agent together with the end surfaces of optical fibers 11 and 12 so that the respective end surfaces become flush with one another.

The type of the first adhesive agent for bonding optical fibers 11 and 12 to alignment member 10 is not particularly limited; however, the first adhesive agent is a thermosetting adhesive agent such as an epoxy resin adhesive agent. In contrast to two-component adhesive agents, employing a thermosetting adhesive agent raises no such inconvenience that curing characteristics vary due to errors in the mixing ratio of the liquid components, and thus provides an effect that it is possible to freely control the duration between application and curing of adhesive agent. Furthermore, in contrast to ultraviolet-curable adhesive agents, the thermosetting adhesive agents provide an effect that the adhesive agent can be reliably cured even in areas where ultraviolet rays hardly reach, such as the inner surfaces of through holes 10a.

The first adhesive agent is designed to obtain a degree of hardness that would cause no displacement of optical fibers 11 and 12 when optical fibers 11 and 12 are firmly fixed after curing and then the tip surface of alignment member 10 is polished. A specific example of such an adhesive agent is one-component thermosetting epoxy resin adhesive agent EP171, manufactured by CEMEDINE Co., Ltd. This adhesive agent exhibits a durometer hardness (type A durometer hardness) of 87 after cured and requires curing temperature of as low as 80° C. or above, providing good operability in the curing process.

Second adhesion part 21 is composed of optical fibers 11 and 12 bonded to each other using a second adhesive agent which has, after cured, greater flexibility than the first adhesive agent. A plurality of fiber trunk side-adhesion parts 22 is each composed of optical fibers 11 and 12 bonded to each other using a third adhesive agent which has, after cured, greater flexibility than the first adhesive agent. When large amounts of second adhesion part 21 and fiber trunk side-adhesion parts 22 protrude outwardly from optical fibers 11 and 12, it reduces the operability when inserting optical fibers 11 and 12 through probe cable 80 of optical probe 100 which will be described later. Therefore, at second adhesion part 21 and fiber trunk side-adhesion parts 22, as shown in the enlarged view of FIG. 1B, the adhesive agent may be applied so as to remain at the valley portions where optical fibers 11 and 12 are located close to each other. Both the second and third adhesive agents are adhesive agents having such curing characteristic that they have, after cured, greater flexibility than the first adhesive agent; the second and third adhesive agents may be the same or different.

Figure 4:
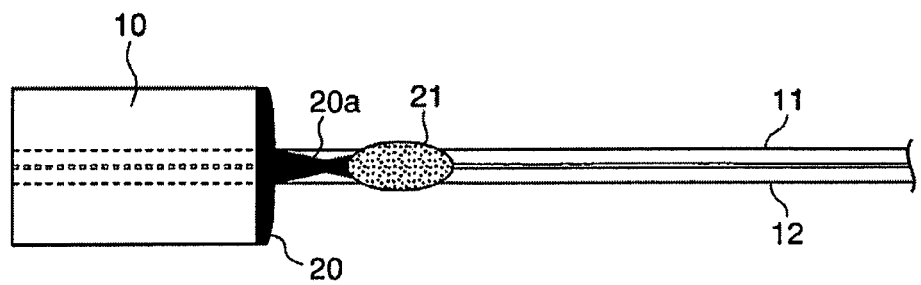
FIG. 4 is a side view illustrating an example where inflow of an adhesive agent occurs at a distal end of the optical fiber assembly.

FIG. 4 shows a side view illustrating an example where an inflow of the adhesive agent occurs at a distal end of the optical fiber assembly.

Second adhesion part 21 is intended to prevent, at the distal end of the optical fiber assembly, the adhesive agent of alignment adhesion part 20 from flowing, by capillary action, into a gap formed between optical fibers 11 and 12 and spreading over a long distance. An end of second adhesion part 21 on the side of alignment member 10 is provided at a position 7 mm or less (more preferably 5 mm or less) from the rear end of alignment member 10, as shown in FIG. 2. With such an arrangement, even when inflow of the adhesive agent of alignment adhesion part 20 has occurred as shown in FIG. 4, it is possible to limit the length of cured portion 20a, generated by the inflow of adhesive agent, to a predetermined level or less. Since cured portion 20a is a high-hardness cured portion of the adhesive agent of alignment adhesion part 20, cured portion 20a lacks flexibility and therefore bending this portion may cause damage to optical fibers 11 and 12. However, if second adhesion part 21 is too close to alignment member 10, the second adhesive agent may contact and be mixed with the first adhesive agent of alignment adhesion part 20 before curing, and predetermined curing performance may not be obtained. Accordingly, both of the adhesive agents are preferably kept separate to an extent that they do not contact each other (e.g., 1 mm or more).

The optical fiber assembly of the present embodiment is designed to be incorporated into optical probe 100 (FIGS. 6A and 6B) that is inserted through a channel of an endoscope into the human body, and therefore a distal end of the optical fiber assembly needs to be flexibly bendable corresponding to the movement of the tip of the tube of the endoscope. The endoscope is configured such that the tip is bent about by 180° inside a human esophagus, and in order for the tip of optical probe 100 to be flexibly bent corresponding to the change in orientation, it is necessary to limit the less flexible portion to a maximum of 10 mm from the tip of alignment member 10, and the portion exceeding 10 mm therefrom needs to have flexibility. Since alignment member 10 is formed to have a length on the order of 3 mm, the above arrangement of second adhesion part 21 makes it possible to secure flexibility necessary for the distal end of the optical fiber assembly.

Figure 5:
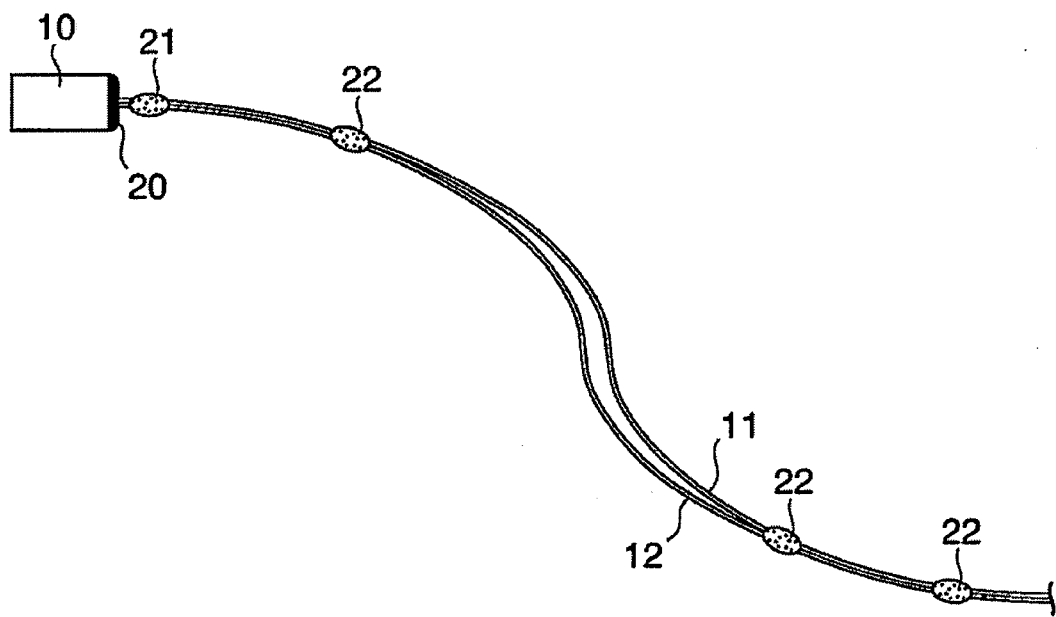
FIG. 5 is a side view illustrating a state in which the optical fiber assembly is bent.

FIG. 5 shows a side view illustrating a state in which the optical fiber assembly is bent.

The plurality of fiber trunk side-adhesion parts 22 provided on the trunk side are intended to bundle the plurality of optical fibers 11 and 12 for easy handling. The plurality of fiber trunk side-adhesion parts 22 are provided at a plurality of locations spaced at any interval, and the plurality of optical fibers 11 and 12 are not bonded to each other between neighboring fiber trunk side-adhesion parts 22. Such a configuration prevents the plurality of optical fibers 11 and 12 from intertwining with each other and getting tangled, and as shown in FIG. 5, and it is possible to flexibly bend optical fibers 11 and 12 in any direction. That is, when optical fibers 11 and 12 are bent in a direction perpendicular to the direction in which optical fibers 11 and 12 are arranged in parallel, optical fibers 11 and 12 can be bent in the same way as when they are singly provided. Moreover, when optical fibers 11 and 12 are bent in a direction in which they are arranged in parallel, optical fibers 11 and 12 are displaced and are no longer arranged in parallel over the section in which optical fibers 11 and 12 are not bonded to each other, and they can be thereby smoothly bent in this direction. Moreover, since second adhesion part 21 and fiber trunk side-adhesion parts 22 themselves also have flexibility, even if these portions are bent, optical fibers 11 and 12 can be bent to a certain extent without being damaged.

The second and third adhesive agents respectively constituting second adhesion part 21 and fiber trunk side-adhesion parts 22 have, after cured, greater flexibility than the first adhesive agent that constitutes alignment adhesion part 20. More specifically, KE45T manufactured by Shin-Etsu Chemical Co., Ltd., which is one-component room temperature curable liquid silicone rubber can be employed as the second and third adhesive agents. This adhesive agent exhibits durometer hardness of 30 (type A durometer hardness) after curing and has a characteristic of being easily deformed by an external force such that its extensibility at the time of cutting with tensile strength of 2.0 MPa (mega-pascal) reaches 350%. Applying an adhesive agent that exhibits type A durometer hardness of 5 to 60 during curing and has extensibility of 120% to 500% under the same condition as that described above, as the second and third adhesive agents, can also achieve substantially the same operation and effect as those described above. For example, it is possible to use a UV-curable adhesive agent, and more specifically, use 3168, 3163, 3164D or the like manufactured by ThreeBond Co., Ltd. The same or different adhesive agents can be selected from among these products for use as the second and third adhesive agents.

FIGS. 6A and 6B illustrate optical probe 100 incorporating the optical fiber assembly: FIG. 6A showing a partially exploded side view of the distal end thereof and FIG. 6B showing an overall plan view.

Optical probe 100 of the present embodiment is composed of: probe cable 80 composed of plural optical fibers 11, 12 and 41 inserted through tube 81; optical connector plug 90 to be connected to an optical apparatus for input/output of light; and the like. Optical connector plug 90 is provided with housing 91 including locking piece 93 to be engaged with a connector of the optical apparatus. Three ferrules 92 are to be coupled with the optical axes in the optical apparatus. Two optical fibers 11 and 12 of the optical fiber assembly are connected to two of three ferrules 92 respectively, with another set of optical fibers 41 being connected to the other one ferrule 92.

As shown in FIG. 6A, alignment member 10 is fixed in front of condensing lens 82 on the distal end side of probe cable 80, and distal ends of other plural optical fibers 41 are fixed so as to surround alignment member 10. According to the present embodiment, one optical fiber 11 inserted through alignment member 10 radiates excitation light and the other optical fiber 12 captures fluorescence. The other plural optical fibers 41 radiate illumination light.

Optical probe 100 configured in this way is used in the manner described below to perform a fluorescence analysis on a site to be diagnosed in the human body. Specifically, optical connector plug 90 of optical probe 100 is connected to the optical apparatus, while probe cable 80 of optical probe 100 is inserted through an insertion channel provided in the endoscope. The physician inserts the endoscope into the human body and moves the distal end of the endoscope to a site to be diagnosed in the human body while watching the video of the endoscope. When advancing the endoscope to the site to be diagnosed, the physician bends and twists the distal end of the endoscope within an angle range of approximately 180° for the observation of the interior of the human body. In this case, the distal end of probe cable 80 and the distal ends of optical fibers 11 and 12 are also likewise bent and twisted corresponding to the movement of the endoscope.

When the distal end of the endoscope reaches the site to be diagnosed, the physician causes the tip of probe cable 80 to come out from the tip of the endoscope, directs the tip to the site to be diagnosed and starts processing of a fluorescence analysis. When the processing of the fluorescence analysis starts, the illumination of the endoscope is turned off and switched to the illumination of optical probe 100. When the physician performs operation of the fluorescence analysis, the illumination of optical probe 100 stops instantaneously and excitation light is radiated onto the site to be diagnosed via one optical fiber 11 of optical probe 100 in the meantime. Immediately thereafter, the fluorescence emitted from the site to be diagnosed resulting from the excitation light is sent to the optical apparatus via the other optical fiber 12 of optical probe 100. The optical apparatus measures the strength and optical spectrum of the fluorescence and analyzes the site to be diagnosed. Such measurements are repeatedly conducted on the site to be diagnosed requiring measurement, and after acquiring the necessary measured data, probe cable 80 is removed from the endoscope, optical connector plug 90 is removed from the optical apparatus and processing of one session of fluorescence analysis is thus completed. Since optical probe 100 is inserted into the human body, it is disposed of at every time of use and replaced by a new one.

Next, the method for manufacturing the optical fiber assembly of the present embodiment will be described.

FIGS. 7A to 7F illustrate a flow of the manufacturing process of the optical fiber assembly, illustrating first to sixth steps. In the manufacturing process of the optical fiber assembly, as shown in FIG. 7A and FIG. 7B, the plurality of optical fibers 11 and 12 are drawn and arranged in parallel first, and a third adhesive agent that has flexibility after cured is applied and cured at a plurality of locations spaced at any interval except the distal end so that the plurality of optical fibers 11 and 12 are bonded together (fiber trunk side bonding step). In this case, the third adhesive agent is preferably only applied to and cured at the valley portions where optical fibers 11 and 12 are located close to each other. When the third adhesive agent is applied so as to swell outside two optical fibers 11 and 12, these portions may preferably be wiped away.

Next, as shown in FIG. 7C and FIG. 7D, the distal ends of optical fibers 11 and 12 are inserted through alignment member 10 (fiber aligning step), first adhesive agent 20A (condition of the adhesive agent of alignment adhesion part 20 before curing is denoted by reference numeral 20A) is applied to the rear end surface of alignment member 10 before, after or in the middle of the step, and is also caused to flow into the inner surface of through hole 10a (adhesive agent applying step). First adhesive agent 20A is preferably applied to an extent that it slightly swells from the rear end surface of alignment member 10 so as to obtain a certain strength or above. However, excessive application (application to such an extent that it swells to a size that is larger than the outer shape of alignment member 10) may cause interference with other parts of optical probe 100, and therefore application of first adhesive agent 20A needs to be controlled to an appropriate amount.

Next, as shown in FIG. 7E, second adhesive agent 21A (condition of fiber adhesion part 21 before curing is denoted by reference numeral 21A) is applied to and cured at a predetermined distance from alignment member 10 (fiber's distal end side bonding step). The position at which second adhesive agent 21A is applied is spaced away from the rear end of alignment member 10 by a predetermined distance (7 mm or less from the rear end of alignment member 10) as described above. The step of application and curing of second adhesive agent 21A may be performed before the step of inserting optical fibers 11 and 12 through alignment member 10 in FIG. 7C or before the step of applying first adhesive agent 20A in FIG. 7D. The position of application of second adhesive agent 21A is preferably spaced 1 mm or more apart from the rear end of alignment member 10.

Thereafter, as shown in FIG. 7F, a step of curing first adhesive agent 20A by heat treatment is performed (adhesive agent curing step). In the middle of this curing processing, first adhesive agent 20A which is not yet cured and has low viscosity may flow into a gap between optical fibers 11 and 12, but second adhesion part 21 blocks this inflow midway and can thereby shorten cured portion 20a caused by the inflow. Such processing allows the manufacturing of the optical fiber assembly in FIGS. 1A and 1B which is easy to handle and maintains flexibility.

As described above, in the optical fiber assembly of the present embodiment, second adhesion part 21 provided at a predetermined distance from the vicinity of alignment member 10 can prevent the first adhesive agent of alignment adhesion part 20 from flowing over a long distance of optical fibers 11 and 12 due to capillary action or the like. The flexibility of the distal end of the optical fiber assembly can be maintained in this way.

Furthermore, since second adhesion part 21 in the vicinity of alignment member 10 is provided at a position within 7 mm from the rear end of alignment member 10, when the fiber assembly is incorporated in optical probe 100 and inserted through the endoscope for use, it is possible to provide the distal end of the optical fiber assembly with flexibility that allows the optical fiber assembly to follow the movement of the distal end of the endoscope.

In the optical fiber assembly of the present embodiment, a plurality of locations of optical fibers 11 and 12 in the longitudinal direction are bonded by fiber trunk side-adhesion parts 22, while the plurality of optical fibers 11 and 12 are not bonded over ranges between fiber trunk side-adhesion parts 22. Therefore, the plurality of optical fibers 11 and 12 can be handled together more easily and the plurality of optical fibers 11 and 12 can be bent substantially uniformly in any direction.

According to optical probe 100 of the present embodiment, the optical fiber assembly that maintains the flexibility and is easy to handle as described above improves operability when optical fibers 11 and 12 are inserted through tube 81 of probe cable 80. Therefore, it is possible to improve the yield of optical probe 100 and reduce the manufacturing cost. Moreover, since the flexibility of the optical fiber assembly is maintained, the flexibility of probe cable 80 is never inhibited either.

Although the above embodiment has illustrated the optical fiber assembly that bundles two optical fibers 11 and 12, three or more optical fibers may be likewise bundled to form an optical fiber assembly. For example, optical fibers for illumination may also be bundled together and bonded to form an optical fiber assembly. When three or more optical fibers are bundled, such a configuration may be adopted that all of the respective optical fibers may be bonded at each fiber trunk side adhesion part or at least one optical fiber may not be bonded, the other two or more optical fibers may be bonded at least at one fiber trunk side adhesion part, and all the optical fibers may be bundled together by a plurality of fiber trunk side-adhesion parts. The above embodiment has described an apparatus that measures fluorescence as emitted light from a region to be measured as an example, but without being limited to this, an apparatus may also be adopted which radiates light onto a site to be measured and measures Raman light or scattered light or the like emitted from the site to be measured.

The disclosure of Japanese Patent Application No. 2011-121644, filed on May 31, 2011, including the specification, drawings and abstract is incorporated herein by reference in its entirety.

INDUSTRIAL APPLICABILITY

The present invention is applicable to, for example, an optical probe used for a medical optical analysis apparatus, an optical fiber assembly incorporated in the optical probe and a method for manufacturing the optical fiber assembly. In addition, the present invention is applicable to an optical fiber assembly incorporated in an optical probe or an optical cable used in various applications and a manufacturing method thereof.

REFERENCE SIGNS LIST

10 Alignment member
10a Through hole
11, 12 Optical fiber
20 Alignment adhesion part (first adhesion part)

21 Second adhesion part
22 Fiber trunk side adhesion part
80 probe cable
81 Tube
82 Condensing lens
90 Optical connector plug
92 Ferrule
100 Optical probe

The invention claimed is:

1. An optical fiber assembly comprising:
a plurality of optical fibers;
an alignment member that is arranged at distal ends of the plurality of optical fibers and that aligns and holds the distal ends of the plurality of optical fibers;
a first adhesion part where the alignment member and the plurality of optical fibers are bonded by a first adhesive agent having curability;
a second adhesion part where the plurality of optical fibers are bonded to each other at a position within a predetermined distance from a rear end of the alignment member that is arranged at the distal ends of the plurality of optical fibers and bonded to the plurality of optical fibers in the first adhesion part, by a second adhesive agent that has, after being cured, greater flexibility than the first adhesive agent; and
fiber trunk side-adhesion parts provided at a plurality of locations in a longitudinal direction of the plurality of optical fibers, the fiber trunk side-adhesion parts each being composed of the plurality of optical fibers bonded to each other by a third adhesive agent that has, after being cured, greater flexibility than the first adhesive agent,
wherein the plurality of optical fibers include three or more optical fibers, and
wherein at least one of the optical fibers is left non-bonded in the fiber trunk side-adhesion part.

2. The optical fiber assembly according to claim 1, wherein the predetermined distance is 7 mm or less from the rear end of the alignment member.

3. The optical fiber assembly according to claim 1, wherein the second adhesive agent and the third adhesive agent are the same adhesive agents.

4. The optical fiber assembly according to claim 1, wherein the plurality of optical fibers are non-fiber-coated cable conductors that comprise a core, a clad and at least a primary coat.

5. An optical probe comprising:
the optical fiber assembly according to claim 1;
a tube through which the optical fiber assembly is inserted; and
an optical connector provided on a proximal end side of the tube and connectable to an optical apparatus,
wherein the alignment member of the optical fiber assembly is fixed to a distal end side of the tube and a proximal end side of the optical fiber assembly is connected to the optical connector so as to receive or emit light.

6. An optical fiber assembly comprising:
a plurality of optical fibers;
an alignment member that aligns and holds the plurality of optical fibers;
a first adhesion part where the alignment member and the plurality of optical fibers are bonded by a first adhesive agent having curability;
a second adhesion part where the plurality of optical fibers are bonded to each other at a position within a predetermined distance from a rear end of the alignment member by a second adhesive agent that has, after beinq cured, greater flexibility than the first adhesive agent; and
fiber trunk side-adhesion parts provided at a plurality of locations in a longitudinal direction of the plurality of optical fibers, the fiber trunk side-adhesion parts each being composed of the plurality of optical fibers bonded to each other by a third adhesive agent that has, after being cured, greater flexibility than the first adhesive agent,
wherein the plurality of optical fibers include three or more optical fibers, and
wherein at least one of the optical fibers is left non-bonded in the fiber trunk side-adhesion part.

* * * * *